United States Patent [19]

Chang et al.

[11] Patent Number: 5,041,735

[45] Date of Patent: Aug. 20, 1991

[54] MINIATURE INFRARED TEST TARGET

[75] Inventors: David B. Chang, Tustin; Slava A. Pollack, Palos Verdes Estate; Kenn S. Bates, Long Beach; I-Fu Shih, Los Alamitos, all of Calif.

[73] Assignee: Hughes Aircraft Company, Los Angeles, Calif.

[21] Appl. No.: 475,574

[22] Filed: Feb. 6, 1990

[51] Int. Cl.$^5$ .............................................. G01J 1/00
[52] U.S. Cl. ............................. 250/495.1; 250/494.1
[58] Field of Search ............. 250/494.1, 495.1, 504 R; 273/348.1

[56] References Cited

U.S. PATENT DOCUMENTS

| | | | |
|---|---|---|---|
| 3,227,879 | 1/1966 | Blau et al. | 250/495.1 |
| 4,299,451 | 11/1981 | Task et al. | 350/407 |
| 4,446,363 | 5/1984 | Lakin et al. | 250/203 |
| 4,598,206 | 7/1986 | Nelson | 250/495.1 |
| 4,620,104 | 10/1986 | Nordal et al. | 250/495.1 |
| 4,647,783 | 3/1987 | Verona | 250/495.1 |
| 4,769,527 | 9/1988 | Hart et al. | 250/494.1 |
| 4,859,080 | 8/1989 | Titus et al. | 250/495.1 |
| 4,883,971 | 11/1989 | Jensen | 250/495.1 |

Primary Examiner—Bruce C. Anderson
Attorney, Agent, or Firm—Michael W. Sales; Wanda Denson-Low

[57] ABSTRACT

A miniature infrared test target that comprises a heated four-bar test target operated at a high temperature and a physically separated ambient field operated at ambient temperature. A beamsplitter is disposed relative to the test target and the field in a position to combine and transmit images thereof along a common axis. A lens is disposed along the common axis and forms a combined image of the test target and the field at its image plane. Separation of the test and field targets permits miniaturization of the test target while maintaining a temperature difference between the field and the bars that is proportional to the true temperature difference. The target overcomes the difficulty of maintaining an extremely high temperature gradient in the target. It provides a greater contrast range than that provided by conventional miniature targets. The miniature infrared test target is made with surfaces approximating a blackbody, thereby providing immunity from the Narcissus problem and the effects of complicated environmental changes.

13 Claims, 1 Drawing Sheet

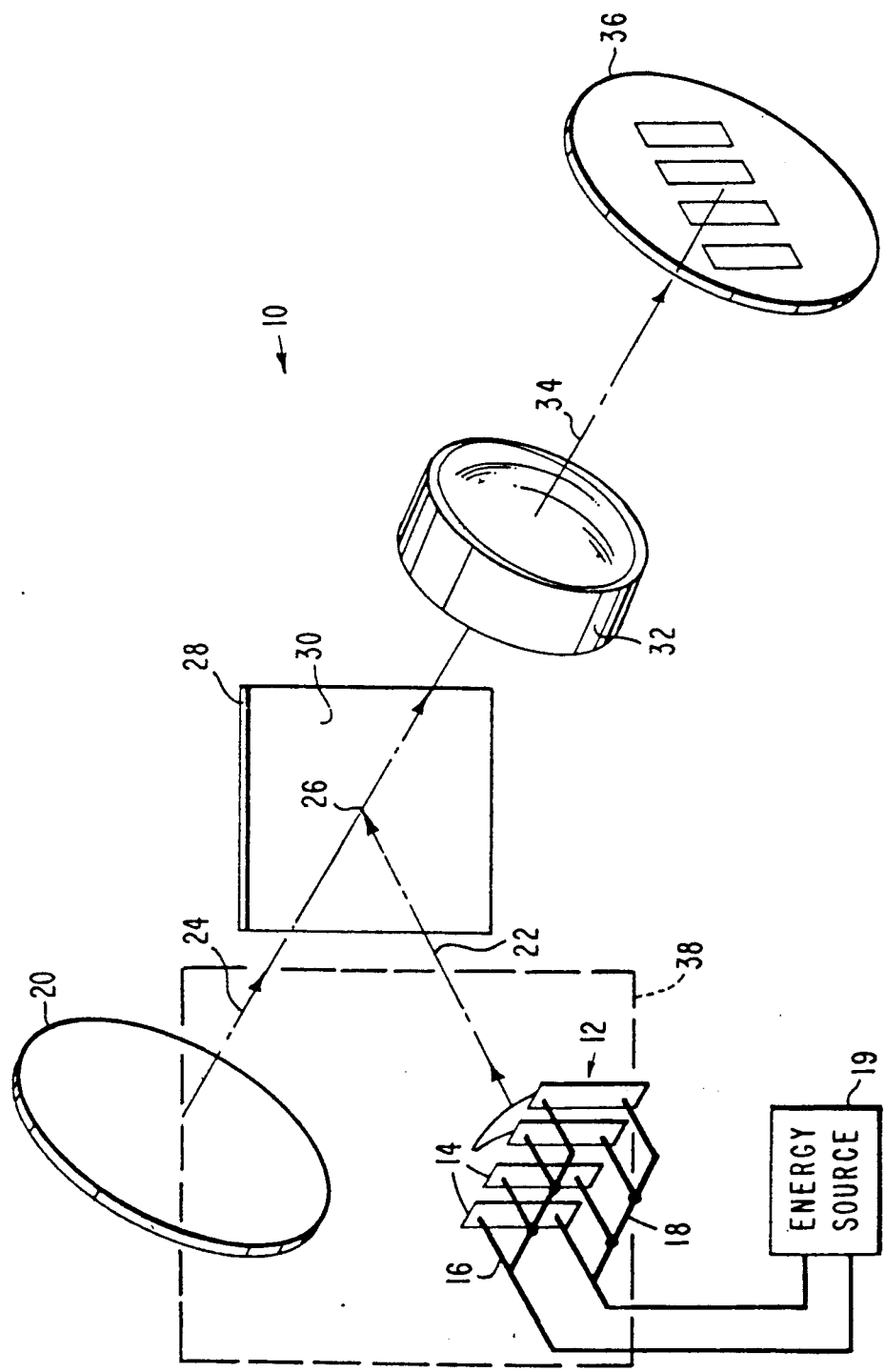

MINIATURE INFRARED TEST TARGET

BACKGROUND

The present invention relates to infrared test targets used for evaluating the performance of infrared equipment, and more particularly, to a miniature thermal target having a four-bar target in front of an ambient field while maintaining the proper temperature difference between the field and the bars.

Heretofore, differential blackbodies have been used as infrared energy emitting test targets to test and evaluate the performance of infrared equipment. Such infrared equipment is employed in forward looking infrared (FLIR) systems and spacebased staring infrared systems, for example. A typical conventional blackbody simply uses an aperture plate located in front of a uniform plate. The temperature difference between the two plates provides the desired contrast.

A more elaborate type of test target is illustrated by U.S. Pat. No. 4,446,363, issued to Charles T. Lakin, et al., May 1, 1984, and assigned to the United States Government. The patent is for a Target for Optically Activated Seekers and Trackers (TOAST). It provides a target for an optically activated seeker which simulates the three degrees of freedom of an actual maneuvering target. It combines a target spot image with a background image by means of a beamsplitter mirror. An optically activated seeker and tracker is positioned in a three degree of freedom gimbal so as to view the combined target and background image. The gimballed mounting system provides the seeker with all the angular inputs of guided missile flight except for those of acceleration forces. The target is calibrated and can be varied as to size, intensity, spatial position, color and interfering background. This test target supersedes a crude system of mounting a small lamp on a plotting board. The plotting board was positioned ten feet in front of the seeker, using the X and Y motions to simulate target motion. The plotting board system was disadvantageous in that the seeker had to be disassembled and focussed for the test at a 10 foot distance, then disassembled and refocused after the test. In addition, the plotting board target could not provide for changes in target intensity or target size. The plotting board system could not provide a competitive background to test the ability of the seeker to reject interfering targets.

Current requirements make it desirable to have miniature infrared test targets particularly for use as field test sets, such as for testing FLIR systems in the field, for example. Unfortunately, present differential blackbodies having an aperture plate located in front of a uniform plate cannot be miniaturized because, when they are scaled down, the blackbodies have an extremely high temperature gradient. It is impractical to maintain an extremely high temperature gradient in a miniaturized differential blackbody test set. This is because the temperature differences between the aperture plate and the uniform plate provides the desired contrast. When the traditional differential blackbody is scaled down to form a miniature test target, the two plates are closer together, and it becomes necessary to maintain an extremely high temperature gradient. The result is an unstable high power consumption device.

The test target in U.S. Pat. No. 4,446,363 is too elaborate and complicated to be miniaturized, and the features it provides are not needed to test FLIR systems in the field. It is not necessary to simulate an actual maneuvering target, or to have a calibrated target that can be varied in size, intensity, spatial motion, color and background.

Other currently used conventional miniature infrared test targets of the type known as miniature emissivity targets have a problem of a non-blackbody nature that makes the targets very sensitive to the Narcissus effect and to complicated environmental changes. This is due to the nature of the surfaces with which it is made. Furthermore, the emissivity targets have a very limited contrast range, and the target has to be kept at a higher temperature than the preferred real world temperature.

Accordingly, it is an objective of the present invention to provide a miniature thermal target having a 4-bar target combined with a target field in which the temperature difference between the field and the bars is proportional to the true temperature difference. Another objective of the invention is the provision of a miniature infrared test target that overcomes the difficulty of maintaining an extremely high temperature gradient in the target. Still another objective of the present invention is to provide a miniature thermal target having a greater contrast range than that provided by conventional miniature targets. Yet another objective of the invention is the provision of a miniature infrared test target that is made with surfaces approximating a blackbody, thereby providing immunity from the Narcissus problem and the effects of complicated environmental changes.

SUMMARY OF THE INVENTION

In accordance with these and other objectives and features of the invention, there is provided a miniaturized infrared test target having target bars and a target field at different temperatures. The target bars and the target field are physically separated from each other and a beamsplitter is used to combine the two optically, in this way, the bars and the field are widely separated so the temperature gradient is greatly reduced. The device is stable, and only the bars which have very small masses need to be heated. Hence, the power consumption is low.

The miniaturized infrared test target of the present invention provides a greater contrast than do other presently existing targets. For a differential blackbody, the contrast is limited by the temperature gradient in the target. For an emissivity target, the contrast is limited by the variation of emissivities and the target temperature. In accordance with the principles of the present invention, because the target bars are separated far apart from the target field, the bars can be heated to a significantly higher temperature. This creates a higher contrast.

The miniaturized infrared test target of the present invention is immune from complicated environmental variations, and it has no Narcissus problem. Because both the target field and the target bars may be made with high emissivity materials approximating blackbodies, the ambient energy will not be reflected from the target. Thus, the target is immune from environmental variations. For the same reason, the detector will not see itself, and hence there is no Narcissus problem.

BRIEF DESCRIPTION OF THE DRAWINGS

The various features and advantages of the present invention may be more readily understood with reference to the following detailed description taken in conjunction with the accompanying drawing, which is an isometric drawing of an infrared test target in accordance with the invention.

DETAILED DESCRIPTION

Referring now to the drawing, there is shown an exemplary embodiment of an infrared test target 10 in accordance with the principles of the present invention. The test target 10 comprises a heated "hot" target 12 comprised of a plurality of bar elements 14 to provide the test signals. Four such bar elements 14 are provided in the exemplary embodiment, although any convenient number may be used. Each of the bar elements 14 is made of a suitable material that can be electrically heated to a high temperature and which has a high emissivity constant. An example of such a material is oxidized nickel-chromium alloy. Typical temperatures are in the range of 30 degrees centigrade to 50 degrees centigrade. The bar elements 14 are physically supported and electrically connected by means such as wire grids 16, 18 and are in turn supported on a target enclosure (not shown in the drawings) and connected to a controlled source 19 of electrical energy. A temperature control maintains the bar elements 14 at a desired temperature above ambient. Only the bar elements 14 need to be heated. The bar elements 14 have very small masses, and the power consumption is low. Preferably, the wire grids 16, 18 are positioned behind the elements 14 as will be discussed below.

Also provided is a uniform plate or target field 20 which serves as a background and is comprised of a generally planar body and is also made of a material having a high emissivity coefficient such as oxidized nickel-chromium alloy. The target field 20 is physically supported within an enclosure (not shown) and is in direct contact with the ambience, thus it is maintained at the ambient temperature. The target bar elements 14 and the field 20 are kept at different temperatures. The hot target 12 and target field 20 are physically displaced one from the other and are located along orthogonally disposed axes 22, 24 respectively. The axes 22, 24 intersect at a point 26. An infrared beamsplitter 28 having a partially reflecting surface 30 is disposed at the point 26 and is disposed at an angle of about 45 degrees with respect to the axes 22, 24. The partially reflecting surface 30 is typically provided by depositing a thin film of metal (e.g. aluminum) on the surface 30, this being a material suited for reflecting infrared energy. The splitting ratio of the beamsplitter 28 determines the proportional constant for the temperature difference between the bar elements 14 and the field 20. A typical beamsplitter 28 splitting ratio is 50/50.

A lens assembly 32 serves as a collimator and is positioned with its optical axis 34 aligned and intersecting the point 26. The hot target 12 and the target field 20 are typically located equal distances from the lens assembly 32. The lens assembly 32 forms a composite image 36 comprised of an image of the hot target 12 and the target field 20 at an image plane. Thus, the bar elements 14 and the target field 20 are optically combined to form a four-bar target. An infrared equipment to be tested (not shown in the figure) is positioned at the image plane, or at a position to focus the image 36 on its detector elements if the equipment is provided with a lens of its own. Equipment to be tested such as a forward looking infrared system, for example, sees this test target 10 as a regular four-bar target with a temperature difference between the field 20 and the bar elements 14 proportional to the true temperature difference. The proportional constant is determined by the splitting ratio of the beamsplitter 28. The hot target 12, the target field 20, the beamsplitter 28, and the lens assembly 32 are typically disposed within a suitable enclosure (not shown in the figure).

All of the components can be miniaturized. In a working embodiment, the test target 10 has dimensions of 1 inch, 1 inch, by 2 inches. It should also be observed that the hot target 12 and the target field 20 may be positioned close to the beamsplitter 28 if the beamsplitter 28 provides a thermal and radiation barrier between the hot target 12 and the target field 20 so as to minimize the thermal gradient therebetween. Alternatively, a suitable thermal shield 38, shown by dashed lines may be positioned between the hot target 12 and the field 20.

The test target 10 of the present invention provides a physical separation of the hot target 12 and the field 20. By employing the infrared beamsplitter 28 to optically combine the target field 20 (background) and the target bar elements 14 (signals), the target field 20 and the target bar elements 14 are physically separated and are kept at different temperatures. Because the target bar elements 14 are separated far apart from the target field 20, the bar elements 14 can be heated to a significantly higher temperature. This creates a higher contrast. The hot target 12 and the field 20 may also be made of suitable materials that provide surfaces that substantially approximate a blackbody. Since blackbodies substantially emit or absorb all radiation, the blackbody characteristics of the hot target 12 and the field 20 significantly reduces or eliminates the Narcissus effect and effects due to complicated environmental changes. Positioning of the wire grids 16, 18, behind the heated bar elements 14 shields them from view of a detector under test. Further, because the bar elements 14 are the only elements to be heated and have only small masses, the target 10 has low power consumption.

Thus there has been described a new and improved infrared test target having a 4-bar target and a target field in which the temperature difference. The target of the present invention overcomes the difficulty of maintaining an extremely high temperature gradient in the target. The target of the present invention provides a greater contrast range than that provided by conventional miniature targets. Another feature of the invention is the provision of a miniature infrared test target that is made with surfaces approximating a blackbody, thereby providing immunity from the Narcissus problem and the effects of complicated environmental changes.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A miniature infrared test target comprising:
infrared target field means at ambient temperature for providing an infrared background signal;
infrared target emitter means for generating a target signal, said target means having a plurality of heatable elements and means connected to the plurality of elements for heating the plurality of elements to a predetermined temperature above ambient temperature; and beamsplitter means for optically combining the infrared background signal and the target signal along a common axis.

2. The test target of claim 1 wherein the target field and target field signal emitter means are made of high emissivity materials.

3. The test target of claim 1 wherein the beamsplitter means comprises a beamsplitter having a partially reflective and transmissive surface, the beamsplitter being optically positioned with the center point of the partially reflective surface being equally spaced between the target emitter means and target field means and at an angle of about 45 degrees with respect to axes extending from the center point to the target emitter means and target field means, respectively.

4. The test target of claim 1 further comprising image forming means for forming a combined image of the background signal and the target signal, wherein the image forming means includes a lens having an optical axis disposed along a common axis.

5. The test target of claim 3 wherein the target signal emitter means comprises a plurality of rectangular heating elements arranged in a planar array.

6. The test target of claim 5 wherein the heating elements are made of oxidized nickel-chromium alloy.

7. The test target of claim 6 wherein the target field signal emitter means comprises a planar member made of oxidized nickel-chromium alloy.

8. The test target of claim 7 wherein the partially reflective surface comprises a thin film of metal (e.g. aluminum) deposited on a transparent planar body.

9. A miniature infrared test apparatus for testing infrared equipment in the field comprising:
a target field at ambient temperature for providing a background infrared signal;
a target for providing a target signal, said target comprising a plurality of heatable rectangular bars of high emissivity material arranged in a row and spaced apart from each other, and a plurality of wires for supporting the bars, the target being physically separated from the target field to provide a low temperature gradient therebetween;
means connected to the target for heating the target to a predetermined temperature above ambient temperature; and an infrared beamsplitter disposed relative to the target and target field for optically combining the target signal with the background signal and for providing a high contrast temperature difference therebetween.

10. A miniature infrared test target for providing a test signal for testing infrared equipment in the field, said test target comprising:
a target field made with high emissivity surfaces that approximate a blackbody source and that are maintained at ambient temperature;
a signal target comprising a plurality of rectangular bars comprising high emissivity surfaces that approximate a blackbody surface and that are supported by wires, the plurality of rectangular bars having low masses and being arranged in a row and spaced apart from each other, the signal target being physically separated from the target field to provide a low temperature gradient therebetween;
a temperature control connected to the signal target for heating only the rectangular bars to a predetermined temperature above ambient temperature; and
an infrared beamsplitter having a predetermined splitting ratio for combining the signal target with the target field while maintaining a high contrast temperature difference therebetween, the proportionality constant of the temperature difference being determined by the splitting ratio of the infrared beamsplitter;
whereby the test target provides an image to infrared equipment under test of a miniaturized conventional four-bar target with a temperature difference between the field and the bars proportional to the true temperature difference.

11. The miniature test target of claim 10 further comprising a collimator disposed between the infrared beamsplitter and the infrared equipment under test.

12. The miniature test target of claim 10 further comprising a thermal shield disposed between the target and target field.

13. The miniature test target of claim 10 and wherein said beamsplitter is separated from each of said signal target and said target field by two inches or less.

* * * * *